(12) United States Patent
Shitanaka (10) Patent No.: US 7,865,136 B2
(45) Date of Patent: Jan. 4, 2011

(54) VEHICULAR AUDIO/VISUAL SYSTEM AND METHOD OF CONTROLLING THE SAME

(75) Inventor: Kazuhisa Shitanaka, Chiryu (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 242 days.

(21) Appl. No.: 12/334,010

(22) Filed: Dec. 12, 2008

(65) Prior Publication Data

US 2009/0158359 A1    Jun. 18, 2009

(30) Foreign Application Priority Data

Dec. 14, 2007   (JP) .............................. 2007-323545

(51) Int. Cl.
| | |
|---|---|
| H04H 40/00 | (2008.01) |
| H04H 20/74 | (2008.01) |
| H04B 1/06 | (2006.01) |
| H04B 1/38 | (2006.01) |
| H04B 7/185 | (2006.01) |
| H04N 7/18 | (2006.01) |
| H04N 7/20 | (2006.01) |
| B60R 25/10 | (2006.01) |

(52) U.S. Cl. ...................... 455/3.02; 455/346; 455/560; 455/3.06; 455/12.1; 725/68; 725/75; 340/426.17; 340/426.18; 340/426.19

(58) Field of Classification Search ................ 455/3.02, 455/346, 560, 3.06, 12.1; 725/68, 75; 340/426.17, 340/426.18, 426.19
See application file for complete search history.

(56) References Cited

U.S. PATENT DOCUMENTS

| | | | | |
|---|---|---|---|---|
| 5,864,753 A | * | 1/1999 | Morita et al. ............. | 455/186.1 |
| 6,111,919 A | * | 8/2000 | Yonge, III .................. | 375/260 |
| 7,181,189 B2 | * | 2/2007 | Hotta et al. ............... | 455/343.3 |
| 7,805,542 B2 | * | 9/2010 | Hindman ........................ | 710/3 |
| 2005/0104644 A1 | * | 5/2005 | Montperrus et al. ......... | 327/277 |
| 2007/0205941 A1 | * | 9/2007 | Riley et al. ............ | 342/357.12 |
| 2010/0034190 A1 | * | 2/2010 | Yun et al. .................... | 370/350 |
| 2010/0220818 A1 | * | 9/2010 | Yamamoto et al. .......... | 375/340 |

FOREIGN PATENT DOCUMENTS

| | | |
|---|---|---|
| JP | 06-224796 A | 8/1994 |
| JP | 09-116447 A | 5/1997 |

(Continued)

*Primary Examiner*—Matthew D Anderson
*Assistant Examiner*—Bobbak Safaipour
(74) *Attorney, Agent, or Firm*—Kenyon & Kenyon LLP (57) ABSTRACT

A vehicular audio/visual system that receives a transmitted electric wave of video or sound, and that outputs the electric wave by switching to an output mode corresponding to user's instruction from among output modes corresponding to multiple types of media includes: a positional information detecting unit that detects positional information of a vehicle; a receiving area storage unit that stores at least one of an area in which the electric wave can be received and an area in which it is difficult to receive the electric wave; a receiving area determination unit that refers to the receiving area storage unit on the basis of the detected positional information and determines whether the electric wave can be received; an output mode switching unit that prohibits an output mode that outputs the electric wave as video or music from being entered when it is determined that the electric wave cannot be received.

3 Claims, 5 Drawing Sheets

FOREIGN PATENT DOCUMENTS

| | | |
|---|---|---|
| JP | 10-153437 A | 6/1998 |
| JP | 3057624 U | 3/1999 |
| JP | 11-340855 A | 12/1999 |
| JP | 2001-168684 A | 6/2001 |
| JP | 2003-078425 A | 3/2003 |
| JP | 2004-228724 A | 8/2004 |
| JP | 2007-150937 A | 6/2007 |

* cited by examiner

| BROADCASTING SATELLITE NUMBER | | LATITUDE RANGE | | |
|---|---|---|---|---|
| | | ○○~×× | △△~□□ | ◇◇~▽▽ |
| LONGITUDE RANGE | AA~BB | DEAD AREA | DEAD AREA | DEAD AREA |
| | CC~DD | DEAD AREA | DEAD AREA | DEAD AREA |
| | EE~FF | DEAD AREA | DEAD AREA | DEAD AREA |

VEHICULAR AUDIO/VISUAL SYSTEM AND METHOD OF CONTROLLING THE SAME

INCORPORATION BY REFERENCE

The disclosure of Japanese Patent Application No. 2007-323545 filed on Dec. 14, 2007 including the specification, drawings and abstract is incorporated herein by reference in its entirety.

BACKGROUND OF THE INVENTION

1. Field of the Invention

The present invention relates to a vehicular audio/visual system that receives an electric wave of video or music transmitted from a broadcasting station and outputs the video or music from a display or a speaker and a method of controlling the vehicular audio/visual system and, more particularly, to a vehicular audio/visual system that is able to receive multiple electric waves transmitted thereto and output one of the multiple electric waves, which is selected by the user, and a method of controlling the vehicular audio/visual system.

2. Description of the Related Art

Various types of broadcasting, such as video or music, are terrestrially provided. Different types of broadcasting may be received in areas. In addition, multiple types of broadcasting may be received within the same area. For example, the radio or the television is provided not only through terrestrial broadcasting but also through satellite broadcasting, and it is known that the coverage area of terrestrial broadcasting and the coverage area of satellite broadcasting each are unevenly distributed. Vehicle are usually equipped with a receiving device that is capable of handling various types of broadcasting; however, the vehicles are mobile units and may be shipped to extensive range of destinations. Thus, it may be difficult for the receiving device to receive all types of receivable broadcasting.

Then, it has been suggested that a receiving device displays a broadcast area on the basis of a current position of a vehicle (see Japanese Patent Application Publication No. 6-224796 (JP-A-6-224796), for example). JP-A-6-224796 describes that, in an FM multiplex broadcasting receiving device, only broadcast areas that allow multiplex broadcasting to be received are selectably displayed on a display to thereby prevent, for example, a situation in which the occupant selects a broadcast area that does not allow the multiplex broadcasting to be received and, as a result, the receiving device becomes silent.

However, the receivable broadcast areas are displayed by the receiving device described in JP-A-6-224796. If a plurality of receivable types of media (types of broadcasting, such as analog or digital television, analog or digital radio, or satellite broadcasting, channels in each type of broadcasting, and the like) are present in the broadcast areas, it is necessary to prepare a display screen for each type of media. In this case, the occupant is required to switch the display screen, or the like. Thus, usability is deteriorated.

SUMMARY OF THE INVENTION

The invention provides a vehicular audio/visual system that allows only receivable media to be selected or allows only the receivable media to be started up without impairing usability, and a method of controlling the vehicular audio/visual system.

A first aspect of the invention provides a vehicular audio/visual system. The vehicular audio/visual system that receives a transmitted electric wave of video or sound, and that outputs the transmitted electric wave by switching to an output mode corresponding to user's instruction from among output modes corresponding to multiple types of media includes: a positional information detecting unit that detects positional information of a vehicle; a receiving area storage unit that stores at least one of an area in which the transmitted electric wave can be received and an area in which it is difficult to receive the transmitted electric wave; a receiving area determination unit that refers to the receiving area storage unit on the basis of the detected positional information and determines whether the transmitted electric wave can be received; an output mode switching unit that prohibits an output mode that outputs the transmitted electric wave as video or sound from being entered when it is determined that the transmitted electric wave cannot be received.

According to the first aspect of the invention, in an area in which a transmitted electric wave cannot be received, entering the output mode of video or music, transmitted through the transmitted electric wave, is prohibited. Thus, it is possible to prevent an output mode that outputs a transmitted electric wave that cannot output video or music from being entered to become silent.

A second aspect of the invention provides a method of controlling a vehicular audio/visual system that receives a transmitted electric wave of video or sound, and that outputs the transmitted electric wave by switching to an output mode corresponding to user's instruction from among output modes corresponding to multiple types of media. The method includes: detecting a current position of a host vehicle; determining, on the basis of the detected current position of the host vehicle, whether the host vehicle is within an area in which the transmitted electric wave can be received; and prohibiting an output mode that outputs the transmitted electric wave from being entered when it is determined that the host vehicle is outside the area in which the transmitted electric wave can be received.

According to the above aspects, it is possible to provide a vehicular audio/visual system that allows only receivable media to be selected or allows only the receivable media to be started up without impairing usability, and a method of controlling the vehicular audio/visual system.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
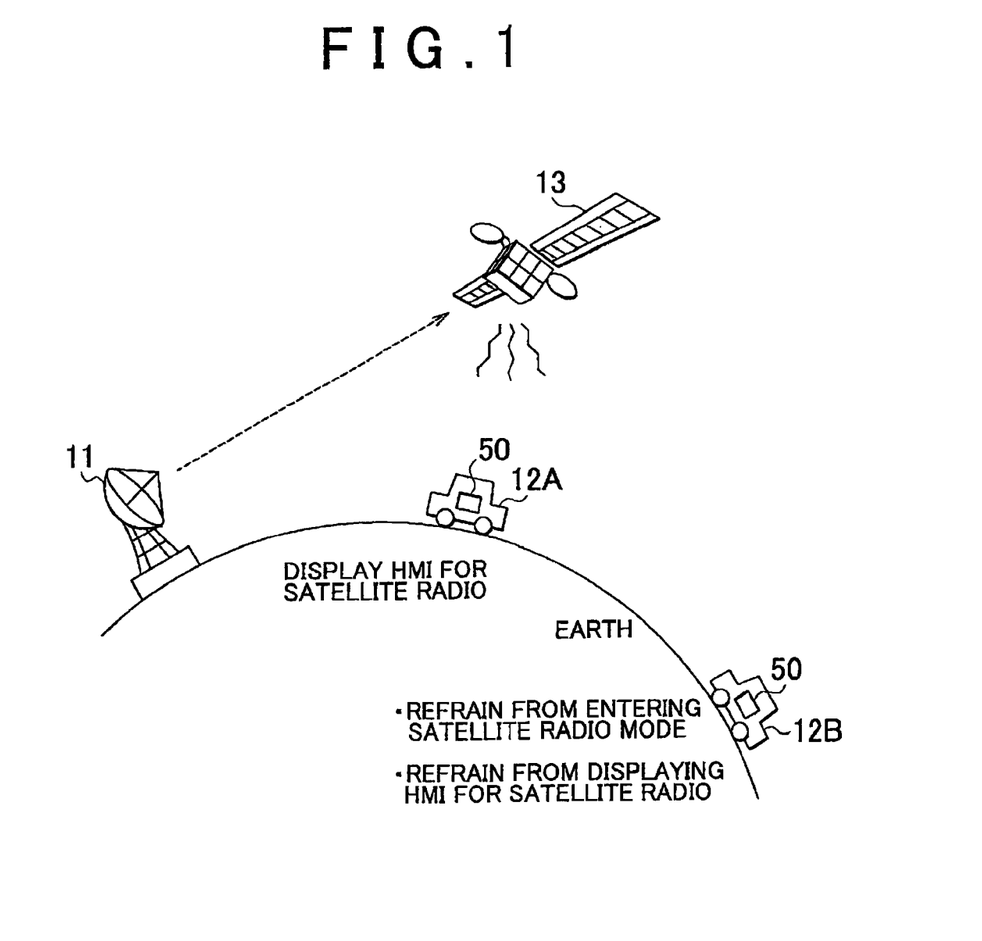
FIG. 1 is a view that schematically shows satellite broadcasting.

Hereinafter, embodiments according to the invention will be described with reference to the accompanying drawings. FIG. 1 is a view that schematically shows satellite broadcasting. A broadcasting main station 11 transmits a digital signal, in which broadcasts of multiple channels are multiplexed, to a broadcasting satellite 13. The broadcasting satellite 13 is, for example, a geosynchronous satellite that synchronously orbits with respect to the earth or a quasi-zenith satellite that orbits along a locus inclined with respect to the equatorial plane. The broadcasting satellite 13 transmits an electric wave that carries a received data signal to the earth via a high-power transponder (repeater).

As shown in the drawing, an audio/visual device (hereinafter, referred to as AV device) 50 of a vehicle 12A that is within the broadcast area of the broadcasting satellite 13 is able to receive the electric wave, whereas an AV device 50 of a vehicle 12B that is outside the broadcast area is not able to receive the electric wave. The AV device 50 according to the present embodiment stores the broadcast area of the broadcasting satellite 13 in correspondence with positional information beforehand, and determines, on the basis of a current position detected by a global positioning system (GPS), or the like, whether an electric wave from the broadcasting satellite 13 can be received. When it is determined to be within a coverage area in which an electric wave can be received, the AV device 50 allows an output mode (satellite radio mode, or the like, which will be described later) that outputs a broadcast of the broadcasting satellite 13 to be entered, and displays a human-machine interface (HMI) through which the output mode that outputs the broadcast of the broadcasting satellite 13 or programs provided by the broadcasting satellite 13 are selectable. When it is determined to be within a dead area in which it is difficult to receive the electric wave, the AV device 50 does not display the HMI through which a broadcast or programs of the broadcasting satellite 13 are selectable, and prohibits an output mode that outputs the broadcast of the broadcasting satellite 13 from being entered.

For example, in FIG. 1, the AV device 50 of the vehicle 12A displays the HMI through which a broadcast of the broadcasting satellite 13 is selectable, and the AV device 50 of the vehicle 12B does not display the HMI. By so doing, it is possible to prevent the occupant of the vehicle 12B from starting up an output mode that outputs a broadcast of the broadcasting satellite 13 to become silent, and it is possible to improve usability because the HMI for an unviewable broadcast of the broadcasting satellite 13 will not be displayed.

Hereinafter, the HMI for satellite radio will be described as an example; however, the aspects of the invention may also be applied to satellite television and may be applied to broadcasting of which the coverage area is unevenly distributed, such as terrestrial television or terrestrial radio. Note that when the vehicles 12A and 12B need not be distinguished from each other, they are simply referred to as vehicle 12.

Figure 2:
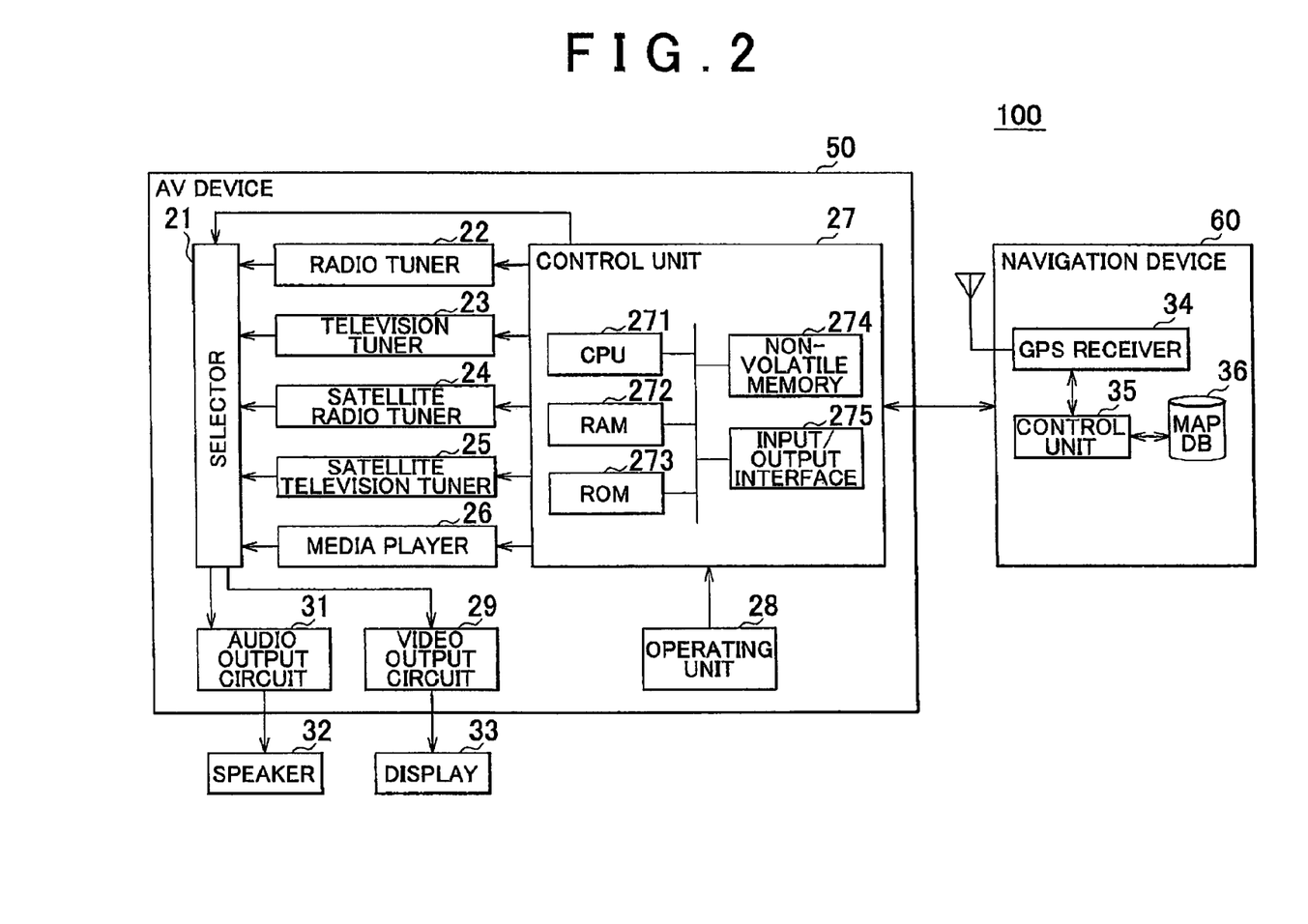
FIG. 2 is an example of a schematic configuration diagram of an audio/visual system.

FIG. 2 shows an example of a schematic configuration diagram of an audio/visual system 100 that includes the AV device 50 and a navigation device 60. The AV device 50 is controlled by a control unit 27 that includes a computer in which a CPU 271, a RAM 272, a ROM 273, a non-volatile memory 274, an input/output interface 275, and the like, are connected via an internal bus. The control unit 27, when the user inputs an instruction through an operating unit 28, controls each block so as to perform an operation corresponding to the instruction, such as selection of a media source to be output from a speaker 32 and/or a display 33 which serve as an output unit, selection of a channel, adjustment of volume, adjustment of sound quality, adjustment of video, switching a displayed image, such as a vehicle rear image, picked up by an on-board camera, or the like. In addition, the CPU 271 of the control unit 27 executes a program for implementing various functions, which will be described later.

The AV device 50 is able to select various types of media as a media source, such as terrestrial radio (analog or digital), terrestrial television (analog, digital, or one-segment), satellite radio (analog or digital), satellite television (analog or digital), or reproducing of a CD, DVD, or memory card. In correspondence with these functions, the AV device 50 includes a radio tuner 22, a television tuner 23, a satellite radio tuner 24, a satellite television tuner 25, and a media player 26.

The radio tuner 22 or the satellite radio tuner 24 amplifies a digital radio signal, received through a given antenna, with an amplifier and then converts the amplified digital radio signal into an intermediate frequency signal (IF signal) with a mixer and a band-pass filter. Then, the intermediate frequency signal is detected and demodulated, and converted into a time division multiplexing (TDM) bit stream, and then data of a predetermined channel is extracted. The extracted data include audio data of a program (on-air program on the predetermined channel) provided for the user, label data attached to the program, and label data of other channels (other programs). The radio tuner 22 or the satellite radio tuner 24 converts the audio data of the receiving channel into a digital audio signal with an audio decoder and inputs the digital audio signal to a selector 21. The digital audio signal output from the selector 21 is converted into an analog audio signal by an audio output circuit 31, and then the analog audio signal is amplified and output from the speaker 32.

In addition, the radio tuner 22 or the satellite radio tuner 24 decodes the label data of the receiving channel into character string data and sends the character string data to the selector 21. The character string data is then displayed on the display 33 from a video output circuit 29. The label data include program information of multiple channels in time sequence, so that the occupant may select a desired radio program. Note that the radio tuner 22 or the satellite radio tuner 24 may be an analog tuner.

The television tuner 23 or the satellite television tuner 25 converts a digital television signal of a digital television broadcast, received through an antenna, into an intermediate frequency signal that includes a target channel with a synthesizer tuner circuit. Then, the intermediate frequency signal is decoded, and digital data in MPEG2 format are extracted. After that, video and audio data stream of the target channel are decoded from the extracted digital data. The decoded original digital video signal is output to the selector 21 and is displayed on the display 33 by the video output circuit 29.

Furthermore, the decoded original digital audio signal is supplied to the audio output circuit 31 via the selector 21, converted from the digital signal into an analog signal and amplified, and then output from the speaker 32. Note that the television tuner 23 or the satellite television tuner 25 may be an analog tuner.

The media player 26 reads a digital signal from a CD, DVD, or memory card, which is set through a predetermined insertion port, decodes a video signal such as MPEG2 and an audio signal such as PCM, and then outputs the decoded signals to the selector 21. The audio output circuit 31 converts the digital audio signal into an analog audio signal, amplifies the analog audio signal, and outputs the amplified analog audio signal from the speaker 32. In addition, the video signal output from the selector 21 is displayed on the display 33 by the video output circuit 29.

The operating unit 28 includes, for example, a touch panel integrated with the display 33, a voice input unit, a keyboard, a button, or the like. The operating unit 28 allows the occupant to input an instruction, such as selection of a media source, switching of a channel, or input of a destination of the navigation device 60, which will be described later.

The control unit 27, for example, displays, on the display 33, an HMI for selecting a media source (hereinafter, referred to as source selection HMI) or an HMI for selecting a channel (hereinafter, referred to as program selection HMI). Then, as a media source or a channel is selected through the operating unit 28, the control unit 27 starts up a circuit of the selected media source on the basis of occupant's instruction and switches the circuit of the selector 21.

Note that the control unit 27 may display the type of an output media source or the status of operation, such as receiving sensitivity, on the display 33. In addition, an external reproducing device and the AV device 50 may be connected through a cable or wireless communication and output from the speaker 32 and the display 33.

The navigation device 60 includes a GPS receiver 34, a map data base (DB) 36, and a control unit 35. The GPS receiver 34 acquires positional information of the vehicle 12 on the basis of an electric wave received from a GPS satellite. The map DB 36 stores road map information in correspondence with positional information. The control unit 35 controls the navigation device 60. As the navigation device 60 starts up, the control unit 35 extracts road map information from the map DB 36 on the basis of the positional information acquired by the GPS receiver 34, generates drawing information to be displayed on the display 33 on the basis of the road map information, and sends the generated drawing information to the AV device 50 with a mark that indicates a host vehicle position, an icon that indicates a gas station, or the like, being superimposed on the generated drawing information. In addition, when a destination is input from the operating unit 28, the control unit 35 searches a route from a current position to the destination, and guides the occupant to the destination by, for example, highlighting the route in the drawing information or generating voice information output from the speaker 32 just before turning right or left. Note that in FIG. 2, the AV device 50 and the navigation device 60 are separately shown; they may be integrally formed, instead.

Figure 3A:
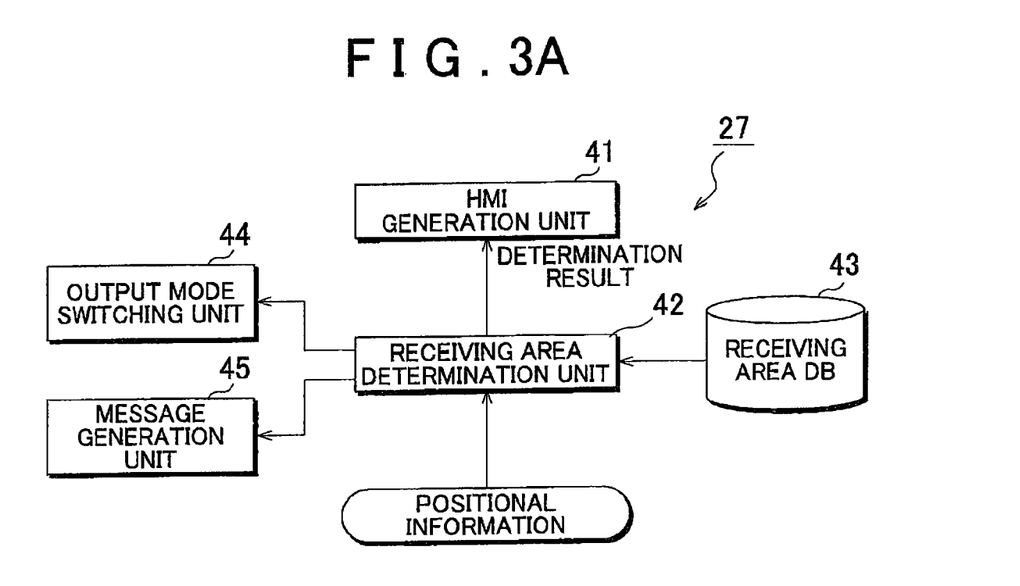
FIG. 3A is an example of a functional block diagram of an AV device.

FIG. 3A shows an example of a functional block diagram of the AV device 50. The control unit 27 of the AV device 50 includes an HMI generation unit 41, a receiving area determination unit 42, an output mode switching unit 44 and a message generation unit 45, which are implemented in such a manner that the CPU 271 executes a program. The control unit 27 stores a receiving area DB 43 in the non-volatile memory 274.

The receiving area determination unit 42 refers to the receiving area DB 43 based on the positional information acquired by the GPS receiver 34, and determines whether the current position is within the coverage area of satellite radio of the broadcasting satellite 13. Thus, a coverage area in which satellite radio can be received, a dead area in which it is difficult to receive satellite radio, or both, are registered in the receiving area DB 43 in correspondence with positional information.

Figure 3B:
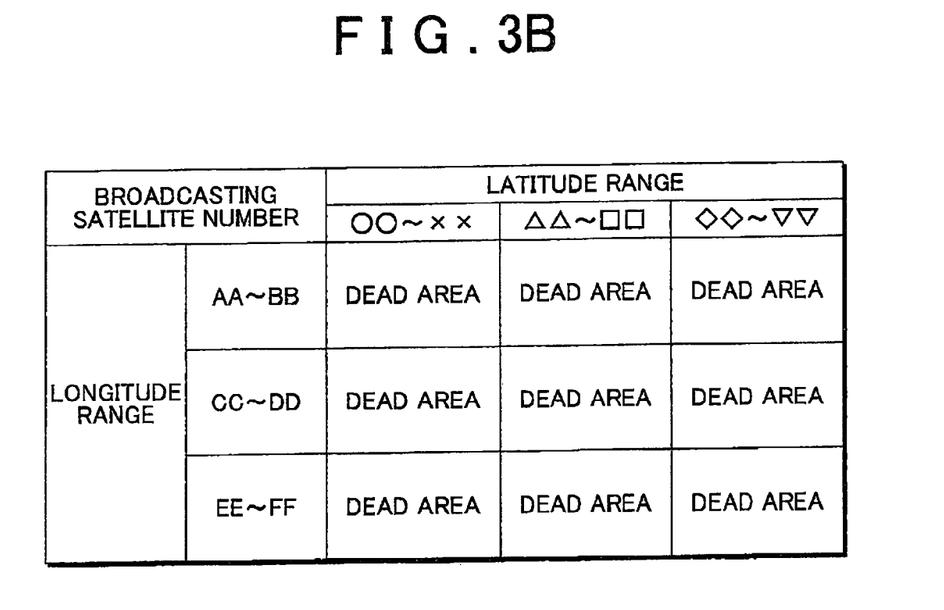
FIG. 3B is an example of a data structure of a database that stores receiving areas.

FIG. 3B shows an example of a data structure of the receiving area DB 43. The receiving area DB 43, for example, specifies dead areas with a latitude range and a longitude range for each broadcasting satellite number that identifies the broadcasting satellite 13. Thus, when the current position is not included in the dead area, it is possible to receive a broadcast of the broadcasting satellite 13. Note that the coverage area may be specified with a latitude range and a longitude range. In addition, whether satellite radio is receivable may be registered in correspondence with a link number of a road.

Incidentally, an electric wave from the broadcasting satellite 13 is sometimes retransmitted by a terrestrial repeater (gap filler). The terrestrial repeater retransmits an electric wave, received from the broadcasting satellite 13, to a location that an electric wave from the broadcasting satellite 13 cannot directly reach, such as the rear side of a building, mountain areas, underground or the inside of a tunnel. An electric wave that is broadcast from the terrestrial repeater is the same as the electric wave that is directly broadcast from the broadcasting satellite 13. Thus, in the present embodiment, when the current position is within the coverage area in which an electric wave from a terrestrial repeater can be received, there is no chance that the area is registered as the dead area in the receiving area DB 43.

The receiving area DB 43 may be stored in the non-volatile memory 274 at the time of shipment of the vehicle 12. Because the coverage area of the broadcasting satellite 13 is mostly fixed, when the vehicle 12 may be shipped to an isolated island or a country having a small land area, in which it is difficult to receive a broadcast of the broadcasting satellite 13, it is only necessary that positional information of the isolated island or the land area is registered in the receiving area DB 43 as the dead area.

In addition, the vehicle 12 establishes connection with a network through a cellular phone network, a wireless LAN, or the like, to communicate with a predetermined server, and is always able to update the registration information of the receiving area DB 43. Thus, even when the number of broadcasting satellites 13 increases or decreases or the coverage area increases or decreases due to installation or removal of terrestrial repeaters, it is possible to prevent a situation that a source selection HMI, or the like, is not displayed when it is within the coverage area or a source selection HMI, or the like, is displayed when it is outside the coverage area.

The coverage area of the broadcasting satellite 13 may be substantially determined through calculation. Around a boundary of the coverage area, an electric field measurement vehicle actually runs to thereby make it possible to measure and determine an electric field strength. In addition, even when the source selection HMI, or the like, is not displayed, the vehicle 12 is able to receive an electric wave from the broadcasting satellite 13. Thus, the vehicle 12 may periodically detect an electric field strength from the broadcasting satellite 13 and may transmit the detected electric field strength to a predetermined server together with positional information. That is, the vehicle 12 may serve as a probe car and may register motorable all roads as to whether satellite radio can be received in the receiving area DB 43.

Referring back to FIG. 3A, the HMI generation unit 41 generates the source selection HMI or the program selection HMI. The HMI generation unit 41 stores an extensible markup language (XML) file in the non-volatile memory 274 in advance, and generates an HMI corresponding to the result of determination. The XML file for HMI is prepared as a unique file irrespective of the result of determination as to whether it is within the coverage area. The HMI generation unit 41 converts the XML file into, for example, an HTML file through XML stylesheet language transformations (XSLT), and generates a desired HMI by applying a cascading style sheet (CSS). The CSS is stored in advance in correspondence with the case in which it is determined to be within the coverage area and the case in which it is determined to be within the dead area. Thus, it is possible to switch the source selection HMI depending on the result of determination. By setting a unique XML file, even when the HMI is switched in correspondence with whether it is within the coverage area, it is possible to suppress an increase in storage capacity.

Figure 4A:
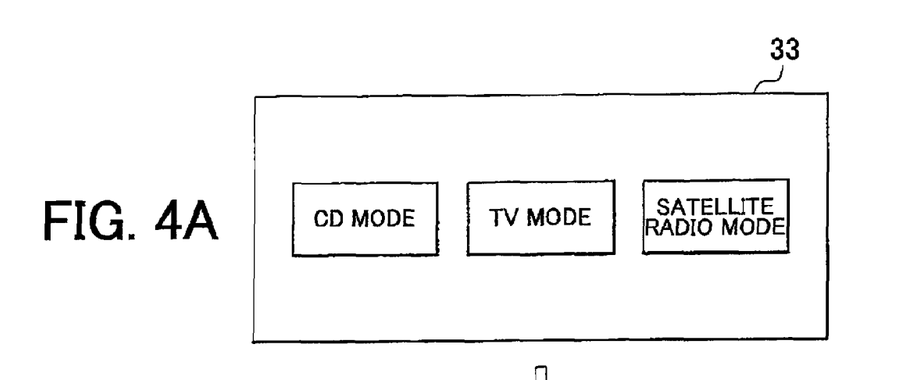
FIG. 4A to FIG. 4C are views that show examples of a source selection HMI and a program selection HMI.
Figure 4B:
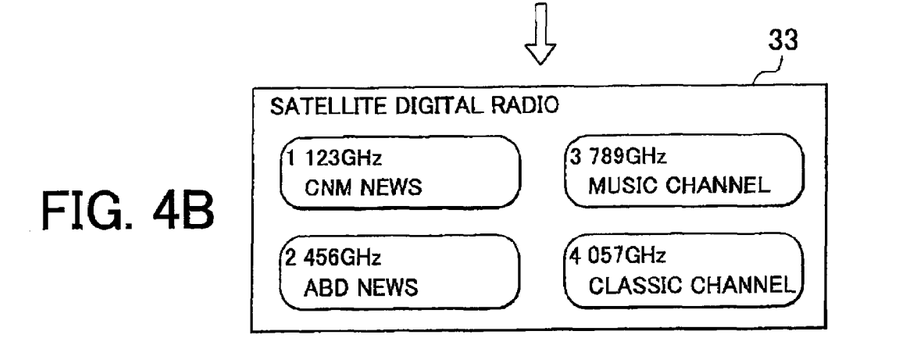
Figure 4C:
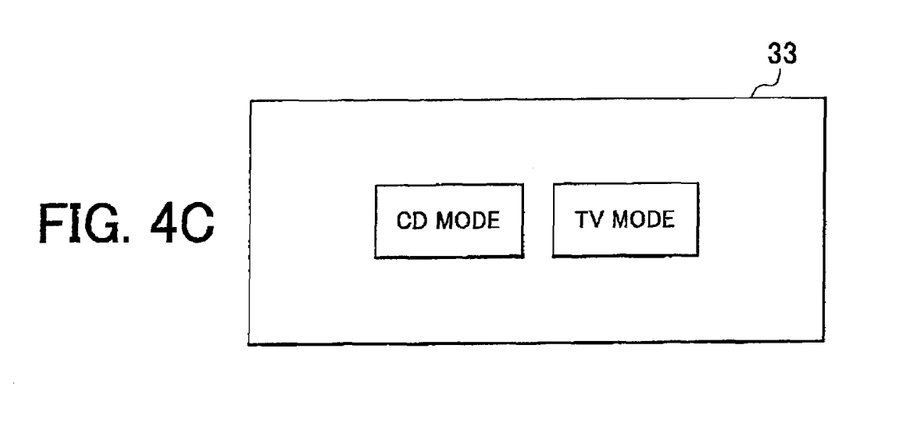

FIG. 4A and FIG. 4B show examples of source selection HMIs when it is determined that the current position is within the coverage area of satellite radio. FIG. 4C shows an example of a source selection HMI when it is determined that the current position is outside the coverage area of satellite radio. As shown in FIG. 4A, when the receiving area determination unit 42 determines that the satellite radio can be received, the HMI generation unit 41 generates a source selection HMI that allows a "satellite radio mode" to be selected. Then, as the user selects the "satellite radio mode" using a touch panel, a button, or the like, as shown in FIG. 4B, the HMI generation unit 41 generates a program selection HMI for the satellite radio mode and displays the HMI on the display 33. The user may select a desired radio program through the program selection HMI.

In contrast, when the receiving area determination unit 42 determines that it is difficult to receive satellite radio, as shown in FIG. 4C, the HMI generation unit 41 generates a source selection HMI in which no "satellite radio mode" is displayed. Thus, because the user is not able to select the "satellite radio mode" in a dead area in which satellite radio cannot be received, it is possible to prevent the "satellite radio mode" from being selected when it is within a dead area, in which satellite radio cannot be received, to become silent and, in addition, it is possible to improve usability by not displaying a non-receivable media source.

Note that with reference to FIG. 4A and FIG. 4B, the HMI generation unit 41 generates a source selection HMI and, when the "satellite radio mode" is selected, generates a program selection HMI. The "satellite radio mode" may possibly be selected through a fixed button or voice input of the operating unit 28. When the receiving area determination unit 42 determines that it is difficult to receive satellite radio, the HMI generation unit 41 does not generate a program selection HMI for the satellite radio mode even when the "satellite radio mode" is selected. Thus, irrespective of the way of operating the AV device 50, a source selection HMI and a program selection HMI for the satellite radio mode will not be displayed in a dead area in which satellite radio cannot be received. In FIG. 4A to FIG. 4C, the source selection HMI or the program selection HMI is illustrated. Not only the source selection HMI and the program selection HMI but also all information related to satellite radio, such as program information of the satellite radio is not displayed.

In addition, the output mode switching unit 44 shown in FIG. 3A prohibits the satellite radio mode from being entered when the receiving area determination unit 42 determines that it is difficult to receive satellite radio. When it is prohibited, no HMI related to the satellite radio mode is displayed, and the selector 21 does not switch the circuit. Thus, in a dead area in which it is difficult to receive satellite radio, even when an instruction for entering the "satellite radio mode" is input through a fixed button or voice input of the operating unit 28, the original output mode (for example, CD mode) remains unchanged and, therefore, does not become silent.

Note that when the "satellite radio mode" is selected through a fixed button or voice input, the occupant may be confused even when the original output mode remains unchanged despite the instruction. Thus, the message generation unit 45 outputs an error message from the display 33 or the speaker 32.

Figure 5:
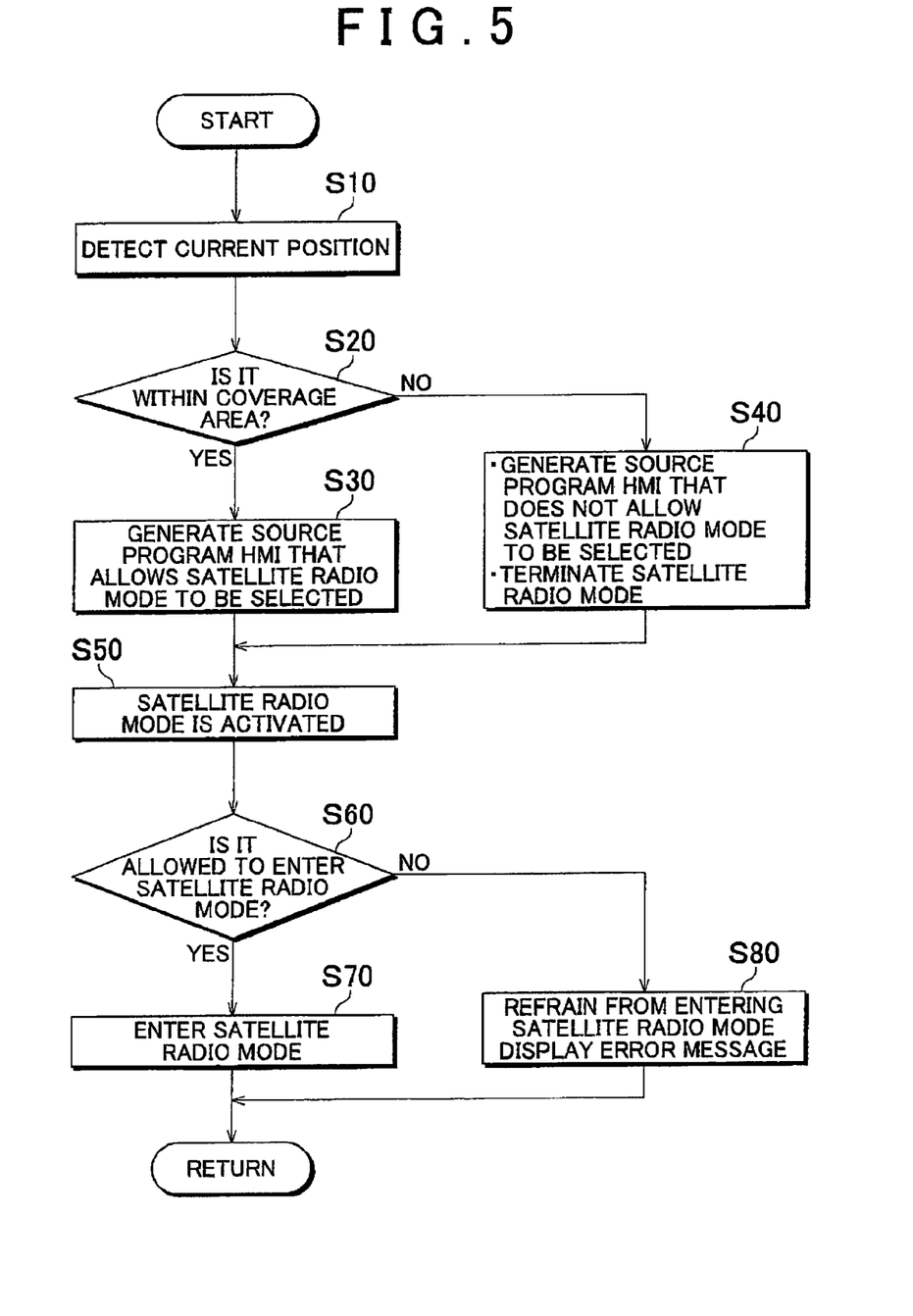
FIG. 5 is a flowchart that shows steps in which the audio/visual system determines whether it is within the coverage area of a broadcast from a broadcasting satellite and switches the HMI.

FIG. 5 is a flowchart that shows steps in which the audio/visual system 100 determines whether it is within the coverage area of a broadcast from the broadcasting satellite 13 and switches the HMI. The flowchart of FIG. 5 is, for example, executed repeatedly at predetermined time intervals.

When the ignition is turned on and while the vehicle is running, the navigation device 60 detects the current position by the GPS receiver 34 (S10). The receiving area determination unit 42 of the AV device 50 refers to the receiving area DB 43 on the basis of the acquired current position, and determines whether the current position is within the coverage area of an electric wave transmitted from the broadcasting satellite 13 (S20). Note that the receiving area determination unit 42 stores the result of determination in the RAM 272 or the non-volatile memory 274. By so doing, it is not necessary to repeatedly determine whether it is within the coverage area.

When the current position is within the coverage area (Yes in S20), the HMI generation unit 41 generates a source selection HMI by which the satellite radio mode is selectable and prepares the source selection HMI so as to be displayable depending on occupant's instruction (S30). By so doing, as the AV device 50 is started up, the source selection HMI shown in FIG. 4A is displayed on the display 33.

When the current position is outside the coverage area (No in S20), the HMI generation unit 41 generates a source selection HMI that does not allow the satellite radio mode to be selected and prepares the source selection HMI so as to be displayable depending on occupant's operation (S40). By so doing, as the AV device 50 is started up, the source selection HMI shown in FIG. 4C is displayed on the display 33. Note that when the satellite radio mode has been executed, and the vehicle enters the dead area while running, the AV device 50 terminates the satellite radio mode. After that, when the AV device 50 is started up, the source selection HMI that does not allow the satellite radio mode to be selected is displayed.

Subsequently, when the occupant selects the satellite radio mode through the source selection HMI or activates the satellite radio mode through a fixed button, or the like, of the operating unit 28 (S50), the receiving area determination unit 42 reads the result of determination in the RAM 272 or in the non-volatile memory 274, and determines whether it is allowed to enter the satellite radio mode (S60).

When it is determined that it is allowed to enter the satellite radio mode (Yes in S60), the AV device 50 enters the satellite radio mode (S70). By so doing, the program selection HMI for satellite radio is displayed as shown in FIG. 4A. In addition, once the program selection HMI is displayed, for example, a program of the channel that has been last set is automatically output from the speaker 32.

When it is determined that it is not allowed to enter the satellite radio mode (No in S60), the output mode switching unit 44 prohibits the satellite radio mode from being entered (S80). In this case, it may be regarded that activation of the satellite radio mode is input through a fixed button, or the like. Thus, the message generation unit 45 displays an error message on the display 33 to notify the occupant that an electric wave from the broadcasting satellite 13 cannot be received at the current position. The message generation unit 45 may notify the occupant through voice that an electric wave cannot be received.

As described above, according to the AV device 50 of the present embodiment, there is no chance to enter the satellite radio mode in a dead area in which it is difficult to receive an electric wave from the broadcasting satellite 13 and, therefore, it is possible to prevent the AV device 50 from becoming silent. Because an unreceivable source selection HMI, an unreceivable program selection HMI, or the like, even when selected, will not be displayed, usability may be improved.

What is claimed is:

1. A vehicular audio system that receives a transmitted electric wave of video or sound from a broadcasting station, wherein the video or sound is output from an output portion of the vehicular audio system, comprising:
   an operating unit through which a user inputs an instruction;
   a positional information detecting unit that detects positional information of a vehicle;
   a receiving area storage unit that stores at least one of an area in which the transmitted electric wave of a media source can be received or an area in which it is difficult to receive the transmitted electric wave of the media source;
   a receiving area determination unit that refers to the receiving area storage unit on the basis of the detected positional information and determines whether the transmitted electric wave of a second media source, which is different from a first media source whose video or sound is currently output from the output portion, can be received; and
   an output mode switching unit that prohibits switching to an output mode that outputs the video or sound of the second media source from an output mode that outputs the video or sounds of the first media source, even if the instruction for outputting the video or sound of the second media source from the output portion is input through the operating unit, when it is determined that the transmitted electric wave of the second media source cannot be received.

2. The vehicular audio system according to claim 1, further comprising:
   an operation menu generating unit that generates an operation menu in which an operation icon is arranged for each output mode corresponding to the sound or video of the corresponding media source, wherein
   when it is determined that the transmitted electric wave of the second media source cannot be received, the operation menu generating unit generates the operation menu that does not include the operation icon of the output mode corresponding to the video or sound transmitted by the transmitted electric wave of the second media source.

3. The vehicular audio system according to claim 1, wherein
   the transmitted electric wave is an electric wave of satellite radio or satellite television, which is transmitted from an artificial satellite.

* * * * *